United States Patent

Nittaya et al.

[11] Patent Number: 5,432,619
[45] Date of Patent: Jul. 11, 1995

[54] LABELING METHOD AND APPARATUS THEREOF

[75] Inventors: Hiroshi Nittaya, Ikoma; Masahiro Kohno; Takurou Teragaki, both of Kobe, all of Japan

[73] Assignee: Sumitomo Metal Industries, Ltd., Osaka, Japan

[21] Appl. No.: 994,886

[22] Filed: Dec. 22, 1992

[30] Foreign Application Priority Data

Dec. 25, 1991 [JP] Japan ................................ 3-361572

[51] Int. Cl.⁶ .............................................. H04N 1/40
[52] U.S. Cl. .................................. 358/448; 358/261.1; 358/464; 382/195; 382/199
[58] Field of Search ................ 358/448, 464, 463, 447, 358/443, 261.1; 382/22, 26, 25, 19, 18, 51

[56] References Cited

U.S. PATENT DOCUMENTS 4,630,306 12/1986 West et al. ............................ 382/22
4,791,676 12/1988 Flickner et al. ....................... 382/22
5,231,676 7/1993 Mahoney ............................... 382/22

FOREIGN PATENT DOCUMENTS 2-48778 10/1990 Japan .

Primary Examiner—Edward L. Coles, Sr.
Assistant Examiner—Fan Lee
Attorney, Agent, or Firm—Burns, Doane, Swecker & Mathis

[57] ABSTRACT

A labeling method and a labeling apparatus thereof, whereby a primary label of a binary image is determined and a primary label for the following image is prepared in accordance with the combination of the data of four adjacent images P(i,j), P(i,j+1), p(i+1,j) and P(i+1,j+1) with simpler hardwares.

16 Claims, 10 Drawing Sheets

Fig. 2(a) [[0,0],[0,0]] WFM←0

Fig. 2(b) [[0,0],[0,1]] R←0

Fig. 2(c) [[0,0],[1,0]] RLB←R

Fig. 2(d) [[0,0],[1,1]]

Fig. 2(e) [[0,1],[0,0]] R←f(RLB)

Fig. 2(f) [[0,1],[0,1]] R←f(RLB)

Fig. 2(g) [[0,1],[1,0]] R←g(R,RLB) RLB←R

Fig. 2(h) [[0,1],[1,1]] R←g(R,RLB)

Fig. 2(i) [[1,0],[0,0]] WFM←R

Fig. 2(j) [[1,0],[0,1]]

Fig. 2(k) [[1,0],[1,0]] RLB←R

Fig. 2(o) [[1,1],[1,0]] RLB←R

RLB←R    RLB
          0

R←0    RLB
        0

RLB←R    RLB
          0
          0

Fig. 5 (9)
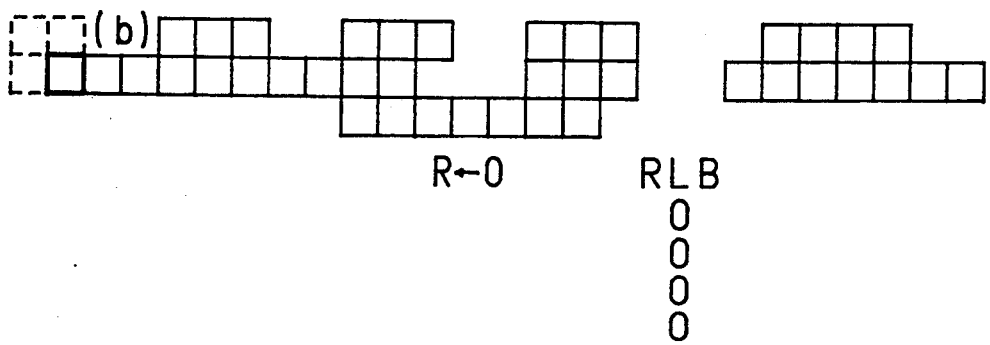
Fig. 5 (10)
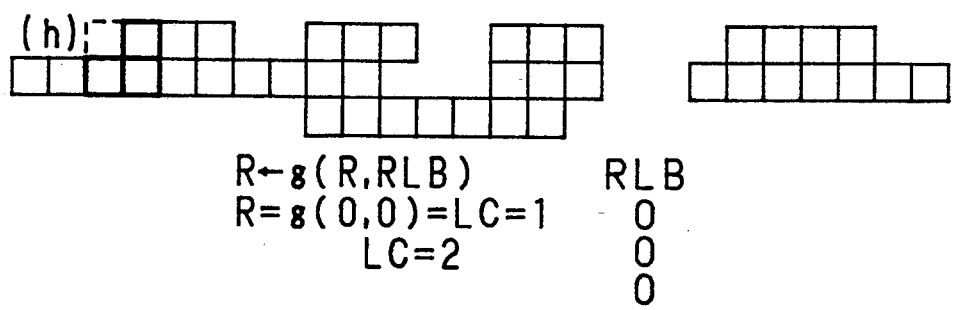
Fig. 5 (11)
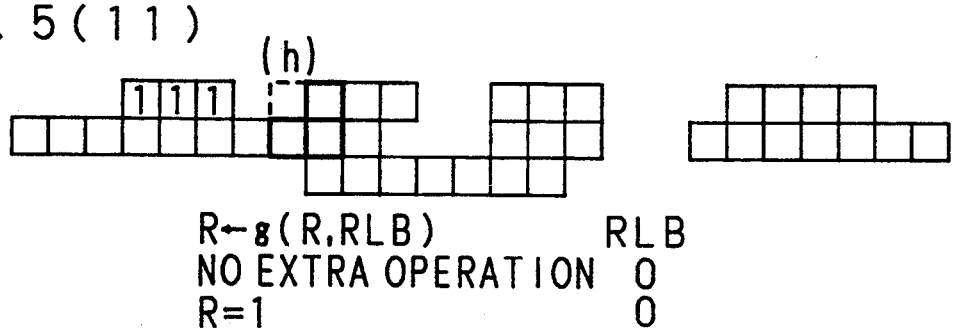
Fig. 5 (12)
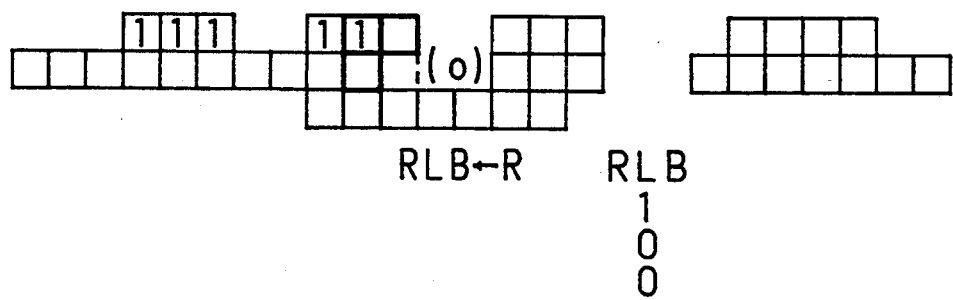

Fig. 9(a) WFM←0 [00/00]
Fig. 9(b) R←0 [00/01]
Fig. 9(c) RLB←R [00/10]
Fig. 9(d) [00/11]
Fig. 9(e) R←f(RLB) [01/00]
Fig. 9(f) R←f(RLB) [01/01]
Fig. 9(g) RLB←R, R←f(RLB) [01/10]
Fig. 9(h) R←g(R,RLB) [01/11]

Fig. 9(i) WFM←R [10/00]
Fig. 9(j) R←0 [10/01]
Fig. 9(k) RLB←R [10/10]
Fig. 9(l) [10/11]
Fig. 9(m) [11/00]
Fig. 9(n) [11/01]
Fig. 9(o) RLB←R [11/10]
Fig. 9(p) [11/11]

LABELING METHOD AND APPARATUS THEREOF

BACKGROUND OF THE INVENTION

1. Field of the Invention

This invention relates to a labeling method for use in processing of binary image and an apparatus thereof.

2. Description of the Prior Art

When processing an image having plural spots (patterns) on the background, a label is assigned to images constituting each spot thereby to identify which spot each image belongs to. The processing procedure is divided in three steps as follows:

(1) Primary labeling

Since the image data is obtained through raster scanning, it is processed according to the scanning order. When the continuity is recognized in a present image to the just-passed image, the same label is assigned to the present image, but when having no continuity, a new label is assigned to the present image.

(2) Unification process

Pixels with different labels assigned subsequent to the above primary labeling are unified if they belong to the same spot.

(3) Secondary labeling

An unifying label is assigned to the images belonging to the same spot as a result of the unification.

An example of the conventional primary labeling method is revealed in Japanese Patent Publication No. 2-48778 (1990). In the conventional method, supposing that a target image for labeling is expressed by (i,j), it is necessary for the purpose of labeling to refer to six images, namely, the subject image, three images in the upper line (i−1,j−1), (i−1,j), (i−1,j+1), and adjacent two images (i,j−1), (i,j+1) in the same line.

Though the labeling is actually achieved in the above-described manner, to save hardwares is greatly demanded in recent years.

SUMMARY OF THE INVENTION

The object of this invention is therefore to provide a labeling method designed to meet 8-point connectivity/4-point connectivity labeling and an apparatus thereof, which is enough to refer to only four images including a target image, accordingly saving hardwares and hardly applying a load onto the hardwares.

The above and further objects and features of this invention will more fully be apparent from the following detailed description with accompanying drawings.

BRIEF DESCRIPTION OF THE DRAWINGS

FIG. 2 is a diagram explanatory of the content of data processing in the case of 8-point connectivity;

FIG. 3 through FIG. 8 are diagrams explanatory of the primary labeling procedure;

FIG. 9 is a diagram explanatory of the content of data processing in the case of 4-point connectivity.

DETAILED DESCRIPTION OF THE PREFERRED EMBODIMENTS

Figure 1:
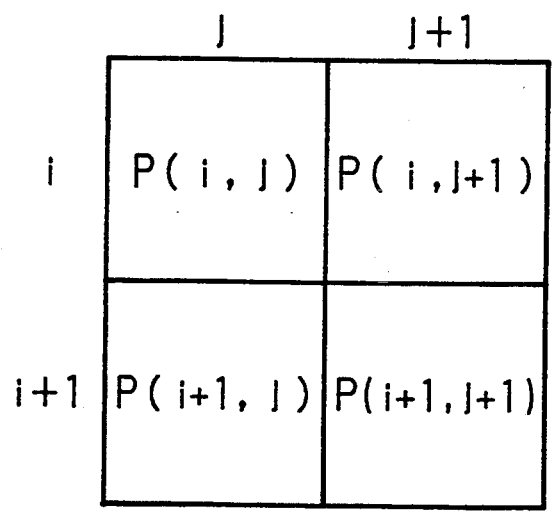
FIG. 1 is a diagram explanatory of the data to be processed in this invention.

A labeling method of this invention will be discussed hereinafter with reference to the accompanying drawings. As shown in FIG. 1, a label for a binary data P(i,j) of a image (i,j) on a column i and a row j is determined by four data, i.e., P(i,j) and P(i,j+1), P(i+1,j) and P(i+1,j+1) of the image (i,j) and adjacent three images (i,j+1), (i+1,j), (i+1,j+1). The label at this time is called as a primary label or a temporary label.

There exist 16 combinations of the binary data of four images as indicated in FIG. 2. In FIGS. 2(a)–2(h), the target image belongs to a background because p(i,j)="0", and therefore "0" is written in a corresponding part of a frame memory (WFM) which stores the primary labeling results. This writing procedure is expressed by "WFM←0". On the other hand, in FIGS. 2(i)–2(p) the target image belongs to a spot because P(i,j)=1, and a temporary label R already determined in the preceding scanning is written in the frame memory, which is represented by "WFM←R".

How to determine the above temporary label R will be depicted. Two functions f(RLB) and g(R,RLB) are prepared to determine the R.

Data P(i+1,j) and P(i+1,j+1) of images one line lower than a target image (i,j) include data of the preceding state of a current spot to which a label is to be assigned. Accordingly, based on the data P(i+1,j) and P(i+1,j+1), a temporary label R assigning to the following image is determined preparatory to its labeling. The preparatory label will be referred to as a run label X hereinafter. A run label latch XDF is provided to store the run label X. Moreover, a run label buffer RLB is disposed to sequentially store a plurality of run labels X's. The run label buffer RLB is a first-in first-out buffer. A latch RDF is also provided for the temporary label R.

The aforementioned functions are defined as follows. It is to be noted here that the output from the run label buffer RLB is transferred to the run label latch XDF when processing any of the functions.

f(RLB):
(1) when X=0, the content of the label counter LC be the temporary label R, then increasing the content of the label counter LC;
(2) when X≠0, the run label X be the temporary label R.

The label counter LC mentioned hereinbefore is a counter for sequentially counting the number of the label to assign from "1".

g(R,RLB):
(1) when X=0 and R=0, the content of the label counter LC be the temporary label R, then increasing the content of the label counter LC;
(2) when X≠0 and R=0, the run label X be the temporary label R;
(3) when X=0, R≠0, hold the last R;
(4) when X≠0, R≠0 and X=R, hold the last R;
(5) when X≠0, R≠0 and X≠R, writing a pair of X and R into a label table LT and a smaller one between X and R be the R.

In the cases where different temporary labels R's are assigned to images belonging to the same spot, it is necessary to change the labels to be same. The label table LT stores the graphic connection data between the different temporary labels.

FIG. 2 also describes processing in 8-point connectivity case of each data pattern.

When the whole four images are "0" as in FIG. 2(a) without any spot, no processing is required.

When only P(i+1,j+1) is "1" as in FIG. 2(b), that is, detecting the upper starting end of a spot, the temporary label R is reset (R←"0"). Since R="0" is an information that a new spot appears, "0" is not written into the frame memory WFM as the temporary label, but the content of the label counter LC is rendered the temporary label R, as will be described later.

When P(i+1,j) alone is "1" as shown in FIG. 2(c), that is, detecting the upper last end, the temporary label R is fed to the run label buffer RLB (RLB←R). Concretely, the buffer RLB forms a queue for labeling.

As shown in FIG. 2(d), when both P(i+1,j) and P(i+1,j+1) are "1", no change is brought about as to the detection of a spot and no processing is thus necessary.

In the case of FIGS. 2(e) and 2(f) when P(i,j+1) alone is "1" or when only p(i,j+1) and P(i+j,j+1) are "1", it means that the lower starting end of the already-appeared spot is detected or the subject spot continues. Accordingly, the temporary label can be determined on the basis of the content of the run label, which procedure is expressed by R←f(RLB).

When only P(i,j+1) and P(i+1,j) are "1", as indicated in FIG. 2(g), R←g(R,RLB) and RLB←R are conducted in order to determine the temporary label.

When only the target image P(i,j) is "0" as in FIG. 2(h), R←g(R,RLB) is performed to determine the temporary label.

Now, the cases of FIGS. 2(i)-2(p) will be depicted. Specifically, in FIG. 2(k) or in FIG. 2(o) where P(i,j+1) and P(i+1,j+1) are "0" or where only P(i+1, j+1) is "0", in order to assign the already-assigned label to the images in the succeeding line, the procedure RLB←R is carried out. In other cases than the above, no extra processing is performed.

The intention of the foregoing processing will now be explained concretely. When detecting spots through raster scanning from the upper left to the lower right, the scanning begins with state (b) and terminates in state (i). Various kinds of patterns may be possible between the states (b) and (i) depending on a shape and size of the spot. In the simplest case where the spot consists of only one image, the pattern changes (b)→(c)→(e)→(i). When it reaches the state (e), X="0" and therefore the first content "1" of the label counter LC becomes the temporary label R in accordance with the case (1) of f(RLB) described earlier. The content of the label counter LC is increased to "2". When reaching the state (i), R="1" is written in the corresponding address for the target image (i,j) in the frame memory WFM.

Now, processing procedures and changes in data when an image contains two spots will be depicted with reference to FIGS. 3-8. In the drawings, chosen four images are indicated by broken lines and the overlapping images with the spot is drawn by thick lines. The state of FIG. 3(1) is identical to FIG. 2(b), and data is processed as R←"0". When reaching the state of FIG. 3(2) identical to FIG. 2(c) through the state of FIG. 2(d), the process RLB←R is carried out, so that the content of the RLB becomes "0".

Figure 3:
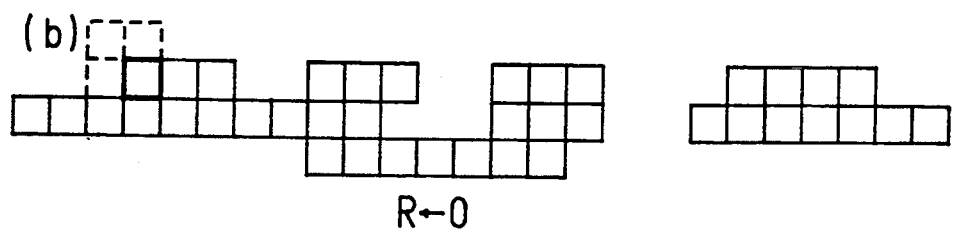
Figure 3:
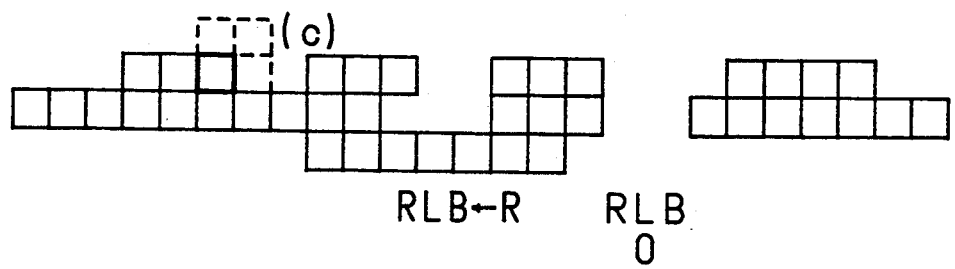
Figure 3:
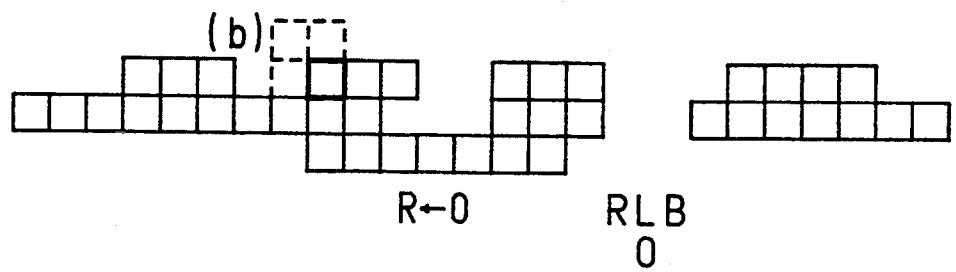
Figure 3:
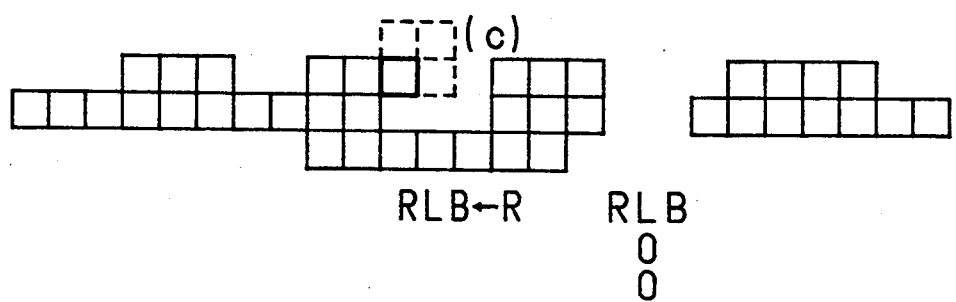

After passing through the state of FIG. 2(a), the state is turned to FIG. 3(3), that is, turned again to the state of FIG. 2(b), the procedure "R←"0" is executed. In the next state of FIG. 3(4), the procedure RLB←R is conducted, so that the RLB stores "0" "0".

Figure 4:
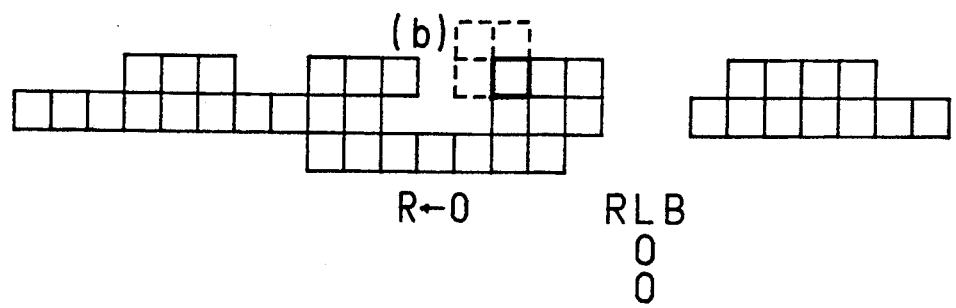
Figure 4:
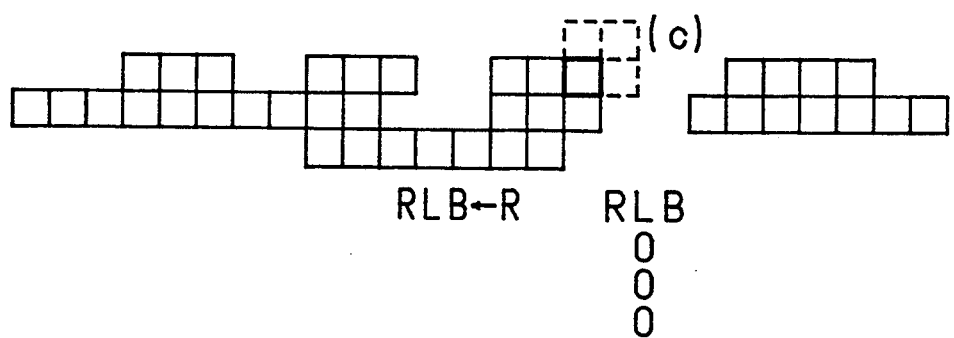
Figure 4:
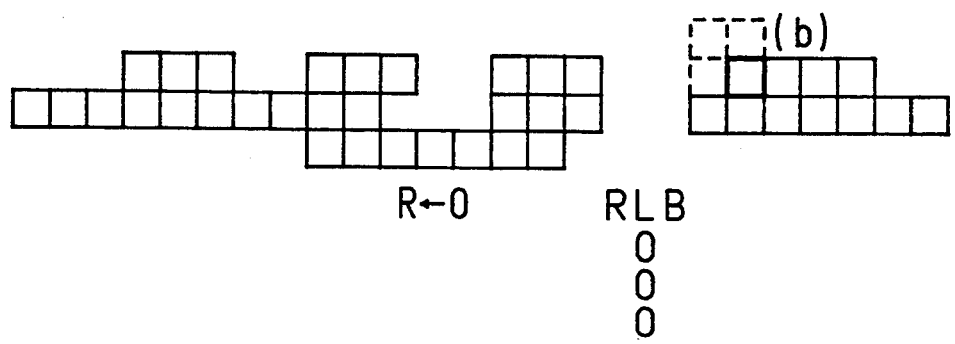
Figure 4:
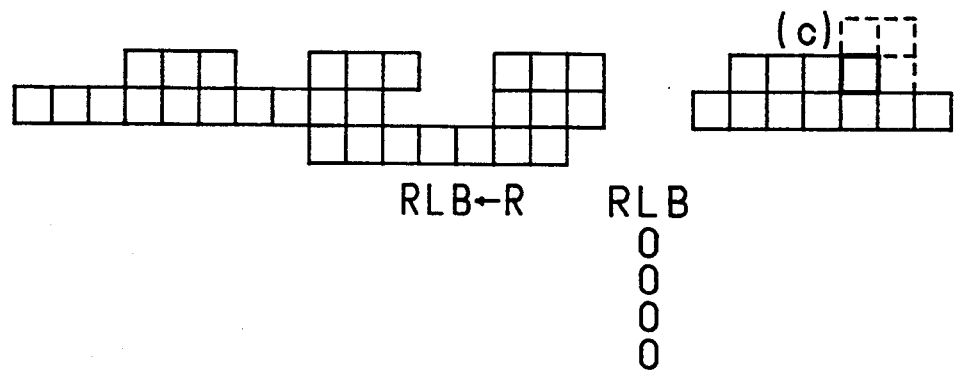

The procedure R←"0" is executed in FIG. 4(5) and then RLB←R in FIG. 4(6), whereby the RLB holds three "0"s. The same procedures as above are repeated for the second spot as shown in FIGS. 4(7) and 4(8).

In stages so far, image processing means has been unable to distinguish that there are only two spots, and therefore prepared four initial values "0"s as the run label X's and sent to the run label buffer RLB as results of detecting four spots.

Referring to FIG. 5(9) in the state of FIG. 2(b) and the procedure R←"0" is conducted.

In FIG. 5(10), the state changes to that in FIG. 2(h), thereby performing processing of the function g(R,RLB). Since the first-in of the RLB, that is, "0" becomes X which satisfies X="0" and R="0", the procedure (1) for g(R,RLB) described hereinbefore is proceeded. Consequently, "1" of the label counter LC is turned to R and the label counter LC is increased to "2".

Since the state of FIG. 2(p) is repeated twice, and then the state of FIG. 2(l) appears once, the procedures WFM←R only are repeated. That is, the temporary label R="1" is written three times into the addresses corresponding to the respective target images (i,j) [referring to FIG. 5(11)].

When in the state of FIG. 5(11) corresponding to FIG. 2(h), processing of the function g(R,RLB) is carried out. More specifically, since the conditions are X←RLB="0" and R="1" which correspond to those in the above-described case (3), no extra processing is performed. That is to say, only the number of data held by the RLB decreases.

Thereafter, the state becomes as in FIG. 2(p) and R="1" is written into the subject address of the frame memory WFM corresponding to the current target image (i,j). As the state of FIG. 5(12) corresponds to FIG. 2(o), not only R="1" is similarly written into the frame memory WFM, but the procedure RLB←R is processed, so that "1" is newly stored in the RLB.

In the succeeding state corresponding to FIG. 2(i), R="1" is written into the frame memory WFM.

Figure 6:
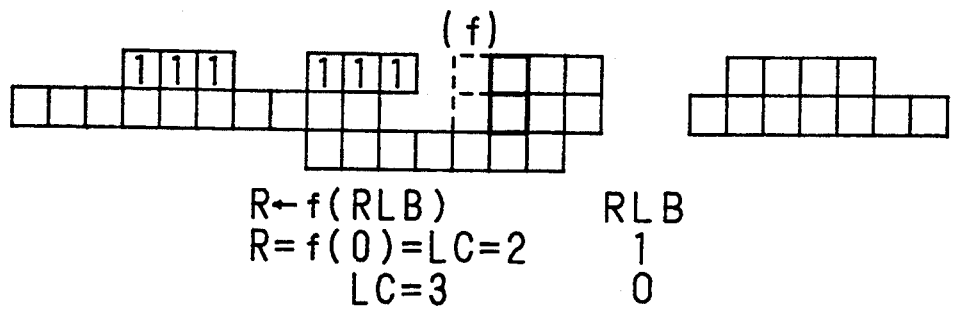
Figure 6:
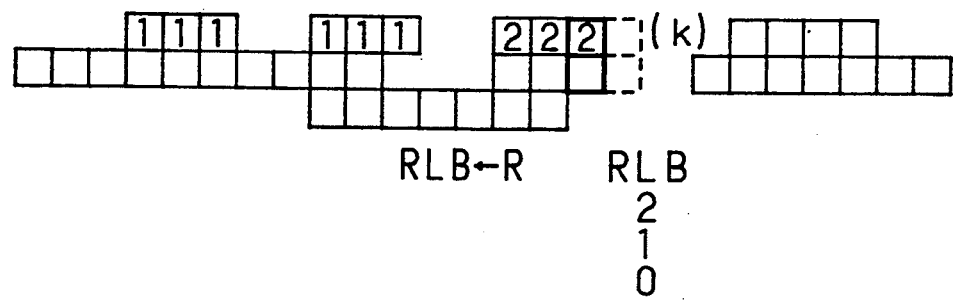
Figure 6:
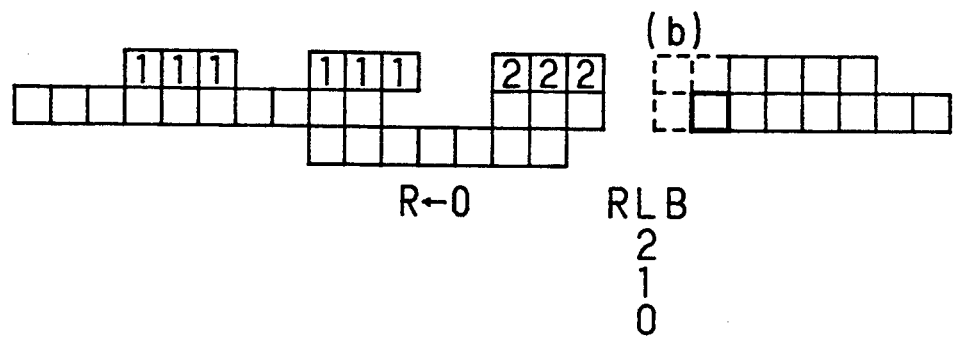
Figure 6:
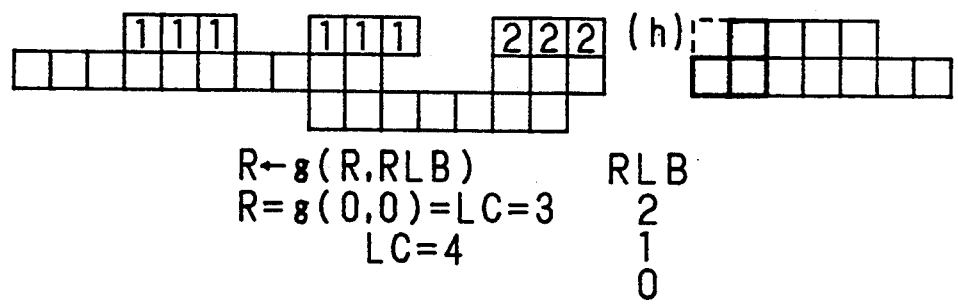

After the state turns to the state as in FIG. 6(13) corresponding to FIG. 2(f) via the state of FIG. 2(a), the function f(RLB) is processed. Since X="0" through the procedure X←RLB, "2" of the label counter LC at this time becomes R, and the label counter LC is increased to "3".

After passing the states of FIG. 2(p) twice and R="2" being written into each corresponding address of the frame memory WFM, the state reaches to that in FIG. 6(14), "2" is newly stored in the run label buffer RLB in accordance with the procedure RLB←R. In FIG. 6(15) corresponding to FIG. 2(b), R←"0" is carried out as a new spot is detected. FIG. 6(16) is identical to FIG. 2(h). In this state, since X="0" and R="0", the same procedure as in FIG. 5(10) is carried out, resulting in R="3" and the content of the label counter LC is increased to "4".

Figure 7:
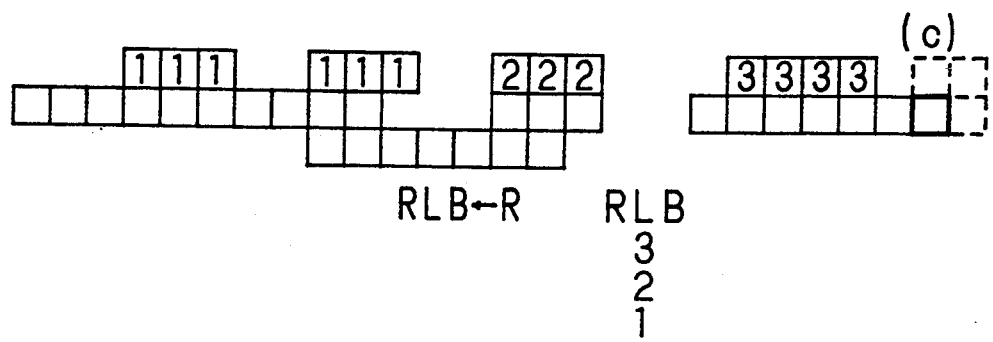
Figure 7:
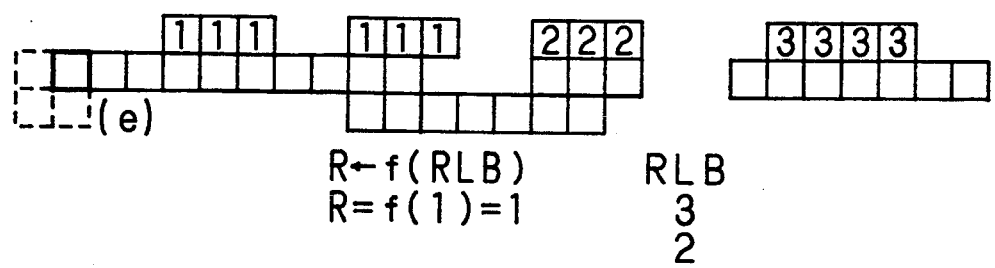
Figure 7:
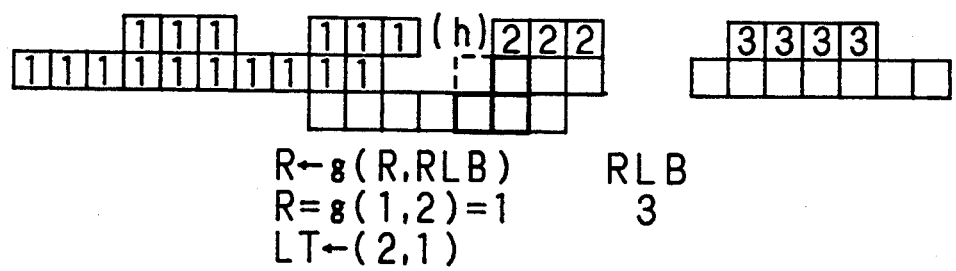
Figure 7:
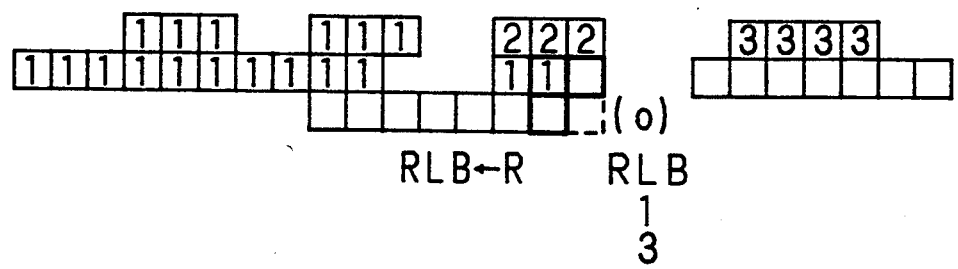

When R="3" is written into the frame memory WFM in FIG. 7(17) [corresponding to FIG. 2(c)], the procedure RLB←R="3" is conducted. In FIG. 7(18) corresponding to FIG. 2(e), the procedure R←f(RLB) is conducted. In this case, since X←RLB="1" and the conditions being coincident with those of the case (2), R←X="1" is executed. The states of FIG. 2(m) are repeated thereafter, and "1"s are written into the frame memory WFM. In FIG. 7(19) corresponding to FIG. 2(h), the processing of g(R,RLB) is performed. Since the conditions are X←RLB="2" and R="1" which correspond to those in the case (5) described before, the smaller "1" among X="2" and R="1" is selected for R. (X,R)=(2,1) is written into the label table LT.

According to R="1", "1" is written in the frame memory. When the state turns to the state in FIG. 7(20) [FIG. 2(o)], the procedure RLB←R is performed whereby the run label buffer RLB stores "1" and "3".

Figure 8:
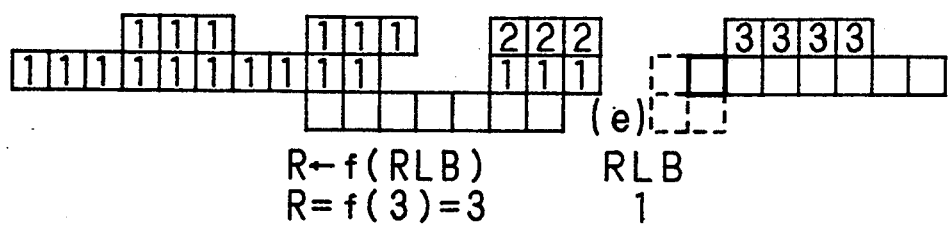
Figure 8:
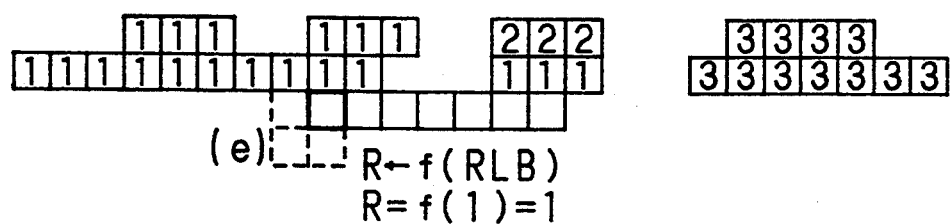
Figure 8:
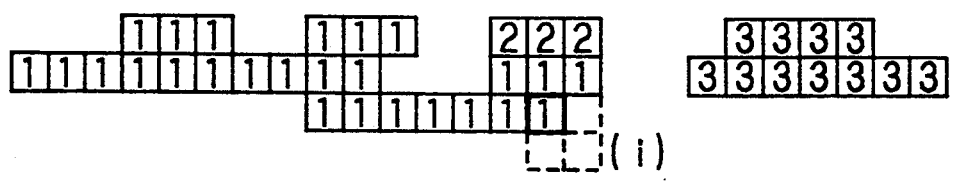

In the state of FIG. 8(21) [FIG. 2(e)], the procedure R←f(RLB) is carried out and X←RLB="3" is processed, resulting in R←X=3. This R="3" is sequentially written until reaching the state of FIG. 8(22) [FIG. 2(e)], whereby the same procedure R←f(RLB) is conducted, but resulting in R="1". Accordingly, "1" is written as shown in FIG. 8(23) [FIG. 2(i)].

The labels "1" and "2" will be unified as follows. FIG. 9 shows the relationship between the content of data processing and data pattern of four images in the case of 4-point connectivity.

In comparison with the case of 8-point connectivity where the same label is assigned to images of value "1" connecting in eight directions, that is, up, down, right, left and diagonal directions, in the case of 4-point connectivity, the same label is assigned to images of value "1" only connecting in four directions, that is, up, down, right and left.

Therefore, the processing procedures are different from the case of 8-point connectivity shown in FIG. 2 only in the state of (g) and (j) where "1"s are present in the diagonal directions. Referring to FIG. 9(j), since "1" in the image P(i+j,j+1) means a new spot being detected, R←"0" is executed. In FIG. 9(g), since P(i,j)="0", P(i+1,j)="1" and P(i+1,j+1)="0" means that the upper last end of the spot is detected, the temporary label R is fed to the run label buffer RLB(RLB←R). Besides, since P(i,j+1)="1", P(i+1,j)="0" and P(i+1,j+1)="0" means that the lower starting end of the spot is detected, the temporary label can be determined based on the content of the run label, so that R←f(RLB) is conducted.

Figure 10:
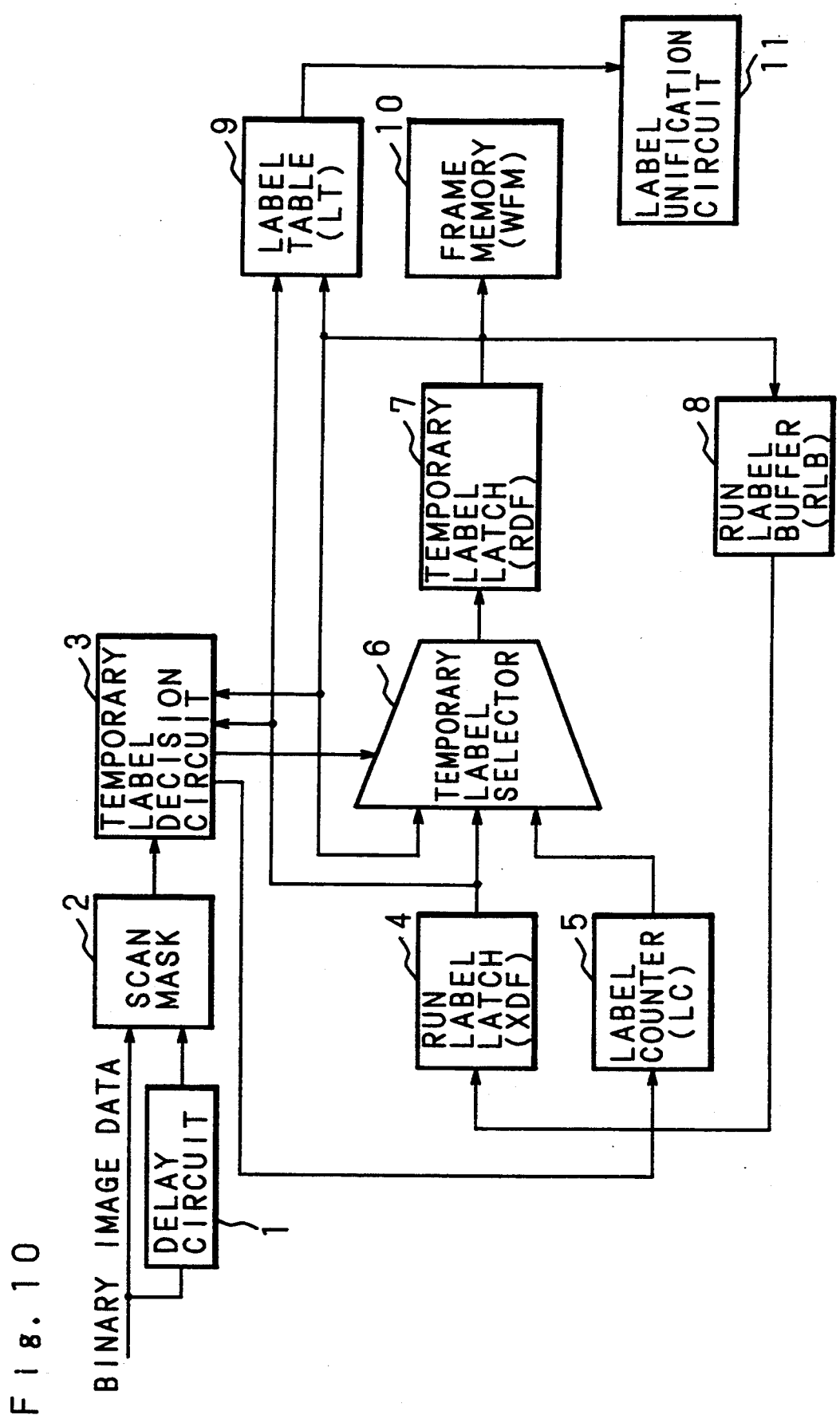
FIG. 10 is a block diagram of a labeling apparatus of this invention.

FIG. 10 is a block diagram of an apparatus for processing the labeling method of this invention. A binary image data is serially inputted bit by bit to a scan mask 2 directly or via a delay circuit 1 which delays the data input to the scan mask 2 by one line. The scan mask 2 sequentially takes in the data of four images P(i,j), P(i,j+1), P(i+1,j), P(i+1,j+1) from the input data and outputs them to a temporary label decision circuit 3. The temporary label decision circuit 3 distinguishes the pattern of the inputted 4-bit data from the scan mask 2 referring to the patterns shown in FIG. 2 or 9, then performs a processing corresponding to the distinguishing pattern.

When processing the procedure R←"0", a temporary, label selector 6 is made to select the output "0" from the temporary label decision circuit 3 and a temporary label latch (RDF) is made to latch the same.

On the other hand, when processing the procedure RLB←R, the content of a temporary label latch (RDF) 7 is inputted to a run label buffer (RLB) 8.

In order to process f(RLB), the content of the RLB 8 is written in a run label latch (XDF) 4, and then the content X of the XDF 4 is read so as to make the content of a label counter (LC) 5 or the content X of the XDF 4 to be selected by the run label selector 6 and latched by the RDF 7. When the content of the label counter (LC) is selected, the content of the LC 5 is increased by one.

In execution of processing of g(R,RLB) as well, the content of the RLB 8 is written into the XDF 4, and the contents X, R of the respective XDF 4, RDF 7 are read to carry out the corresponding processing, that is, to select the content of the LC 5 or XDF 4 to be latched by the RDF 7 and to increase the LC 5 by one. In the case (5) of g(R,RLB) described earlier, the read R, X are written into a label table (LT) 9. At the same time "0" or the content of the RDF 7, i.e., the temporary label "R" is written into a frame memory (WFM) 10 depending on the inputted data.

Then next unification process will be carried out by the label unification circuit 11 based on the content in the label table 9.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A labeling apparatus comprising:
    means for inputting a binary image data through raster scanning;
    means for assigning a temporary label to a target image of a first scan line on the basis of a data pattern formed by four binary image data which include the target image, an adjacent image following the target image in the first scan line and two images in a next scan line adjacent to said two images in the first scan line; and
    means for unifying the temporary label with another temporary label obtained by said assigning means.

2. The labelling apparatus according to claim 1, wherein said unifying means further includes:
    a label unification circuit for reassigning said target image with a secondary label to replace said temporary label.

3. The labelling apparatus according to claim 1, wherein said target image corresponds to a spot representing a single pixel in a scan line.

4. The labelling apparatus according to claim 1, wherein said assigning means further includes:
    a scan mask for distinguishing said data pattern based on said four binary image data by processing said four binary image data as 4-bit data, wherein a single bit can be used to distinguish the data pattern.

5. A labeling method for assigning a label to independent images or assemblages of images of one value among binary image data obtained through raster scanning, which comprises the steps of:
    assigning a temporary label to a target image in a first scan line according to binary image data of four images which include the target image, an adjacent image following the target image in the first scan line, and two images in a next scan line adjacent to said first scan line; and
    unifying the binary image data by replacing said temporary label with a unifying label.

6. The labelling method of claim 5, wherein said step of labelling further includes the step of:
    reassigning said target image with a secondary label to replace said temporary label.

7. The labelling method of claim 5, wherein said target image corresponds to a spot representing a single pixel in a scan line.

8. The labelling method according to claim 5, further comprising the step of:

preparing, during said step of assigning a temporary label to the target image, a run label based on the adjacent image following the target image and the two images in the next scan line.

9. The method according to claim 8, wherein said step of preparing further includes the step of:

analyzing 4-point connectivity of said binary image data for the four images to determine a run label for the adjacent image and the two images in the next scan line prior to labelling the adjacent image and the two images in the next scan line.

10. The method according to claim 5, further comprising the step of:

distinguishing a data pattern based on said four image binary image data by processing said four image binary image data as 4-bit data, wherein a single bit can be used to distinguish the data pattern.

11. A labeling apparatus comprising:

a delay circuit for holding binary image data through raster scanning;

a scan mask for choosing four images which include a target image in a scan line, an adjacent image following the target image in the scan line and two images in a next scan line adjacent to said two images, from the binary image data held by the delay circuit and from binary image data of the next scan line;

a temporary label assigning part including a temporary label decision circuit for selecting a data pattern coinciding with a pattern of the binary image data of said four images chosen by the scan mask, for determining a temporary label to be assigned to the target image and for preparing a run label for a subsequent target image identified using said scan mask, a run label buffer for storing the run label, a latch for latching an output from the run label buffer, a label counter for sequentially increasing a value of a temporary label, a selector for selecting a temporary label for the target image from the label counter or the latch, and a latch for latching an output from the temporary label decision circuit;

a frame memory for storing at least the temporary label of the binary image data;

a label table for storing connection data between independent images or assemblages of images to which different temporary labels are assigned; and a temporary label unification part for unifying said temporary label and said different temporary labels based on the connection data in the label table.

12. The labelling apparatus according to claim 11, wherein said scan mask distinguishes said data pattern based on said four binary image data by processing said four binary image data as 4-bit data, wherein a single bit can be used to distinguish the data pattern.

13. A labeling method for assigning a label to independent images or assemblages of images of one value among binary image data obtained through raster scanning, which comprises the steps of:

assigning a temporary label to a target image in a first scan line on the basis of binary image data of four images which include the target image, an adjacent image following the target image in the scan line, and two images in a next scan line adjacent to the first scan line, and at the same time preparing a run label for the images following the target image by analyzing a state of assemblage of the images in the next scan line; and labeling the binary image data to unify the temporary label of said target image with another temporary label obtained by said step of assigning.

14. The labelling method of claim 13, wherein said step of labelling further includes the step of:

reassigning said target image with a secondary label to replace said temporary label.

15. The labelling method of claim 13, wherein said target image corresponds to a spot representing a single pixel in a scan line.

16. The method according to claim 13, further comprising the step of:

distinguishing a data pattern based on said four image binary image data by processing said four image binary image data as 4-bit data, wherein a single bit can be used to distinguish the data pattern.

* * * * *